United States Patent [19]

Heitmann et al.

[11] Patent Number: 4,556,983
[45] Date of Patent: Dec. 3, 1985

[54] METHOD AND APPARATUS FOR PRE-EMPHASIS COUNTERACTION OF VARIATIONS IN AMPLITUDE OF RECEIVED OR REPRODUCED SERIAL BINARY SIGNALS

[75] Inventors: Jürgen Heitmann, Alsbach-Hähnlein; Horst Rickenbrock, Seeheim-Jugenheim, both of Fed. Rep. of Germany

[73] Assignee: Robert Bosch GmbH, Stuttgart, Fed. Rep. of Germany

[21] Appl. No.: 547,918

[22] Filed: Nov. 2, 1983

[30] Foreign Application Priority Data

Nov. 11, 1982 [DE] Fed. Rep. of Germany ....... 3241648
Dec. 27, 1982 [DE] Fed. Rep. of Germany ....... 3248196

[51] Int. Cl.[4] .............................................. H04B 1/62
[52] U.S. Cl. ......................................... 375/60; 375/58; 375/18; 307/268; 328/58; 328/164; 360/45
[58] Field of Search ....................... 375/18, 19, 58, 60; 307/267, 268; 328/54, 55, 58, 164, 162; 332/18; 360/45

[56] References Cited

U.S. PATENT DOCUMENTS

| | | | |
|---|---|---|---|
| 3,757,132 | 9/1973 | Nilsson | 375/76 |
| 3,806,807 | 4/1974 | Nakamura | 375/58 |
| 3,879,342 | 4/1975 | Patel | 360/45 |
| 4,247,942 | 1/1981 | Hauer | 375/58 |
| 4,293,781 | 10/1981 | Yamada et al. | 307/267 |
| 4,412,337 | 10/1983 | Bickley et al. | 375/60 |

FOREIGN PATENT DOCUMENTS 2829175 7/1980 Fed. Rep. of Germany ........ 370/60

*Primary Examiner*—Robert L. Griffin
*Assistant Examiner*—Raymond C. Glenny
*Attorney, Agent, or Firm*—Frishauf, Holtz, Goodman & Woodward

[57] ABSTRACT

In a serial binary digit stream, when a single bit follows at least two bits of the opposite polarity and is succeeded also by a bit of that opposite polarity, a comparator produces a correction signal which is combined with the first-mentioned bit so as to broaden it in time span. As a result, the amplitude of reception or reproduction of the broadened bit is enhanced so as to compensate for deficiency of amplitude which would result from the imperfection of the transmission channel or recording and reproduction process. The broadening of the critical bit pulse can be performed by a correction pulse that enhances its amplitude, followed by Nyquist filtering and then by amplitude limiting to the normal binary digit amplitude level, or else the broadening can be accomplished by providing a correction pulse shifted in phase by an adjustably shifted clock pulse or train. In the latter case, the phase shifted correction pulse is combined with the critical pulse so as to broaden it, either at the expense of the preceding pulse or at the expense of the pulse that follows.

11 Claims, 30 Drawing Figures

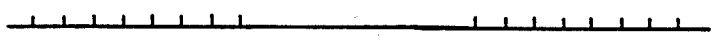
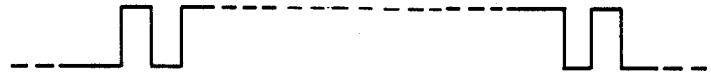
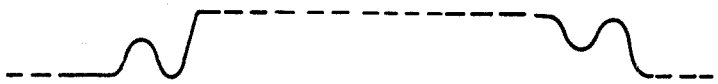
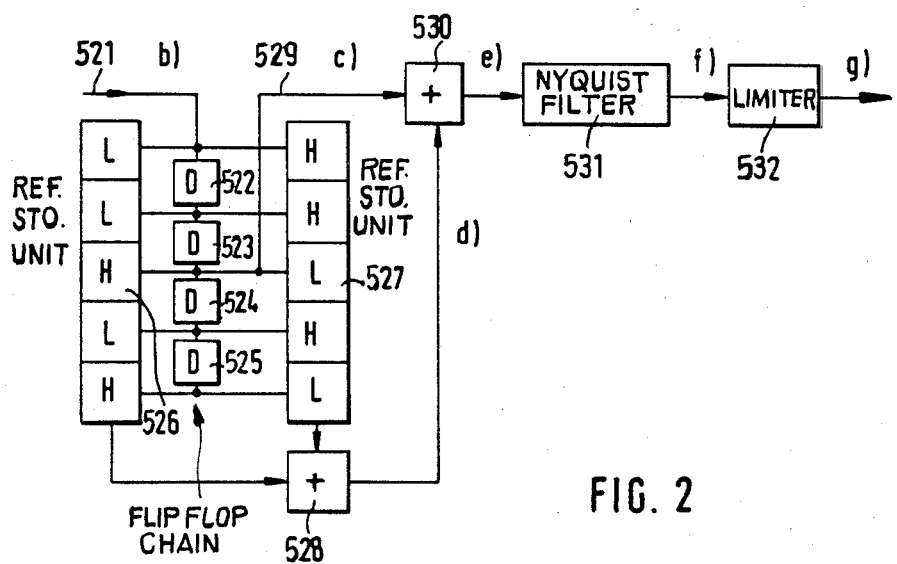

FIG. 3a
FIG. 3b  X X X L L H L H X X X H H L H L X X X
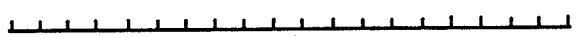
FIG. 3c
FIG. 3d
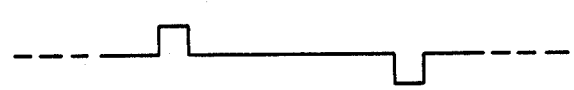
FIG. 3e
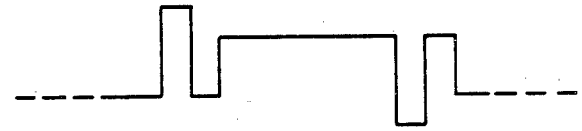
FIG. 3f
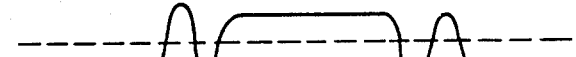
534
535
FIG. 3g

METHOD AND APPARATUS FOR PRE-EMPHASIS COUNTERACTION OF VARIATIONS IN AMPLITUDE OF RECEIVED OR REPRODUCED SERIAL BINARY SIGNALS

The invention concerns a method of counteracting amplitude variations in pulses of a serial binary digit data stream received from a transmission line or system or reproduced from a record such as a magnetic record.

It is known that binary signals are distorted in transmission or in magnetic recording as the result of the imperfection of the transmission path or the recording and reproducing process. One form of distortion has become known as the "peak shift" and concerns the phenomenon that after a series of successive H or L levels of the signal, the amplitude of a following single-bit pulse of opposite polarity is so strongly reduced that its demodulation is possible only with difficulty or is not possible at all.

A system is known from German patent DE-OS No. 22 14 250, patented Nov. 30, 1972, (U.S. Pat. No. 3,757,132; Sept. 4, 1973) for detecting rectangular pulses of equal amplitude but of fluctuating peak value of amplitude. In that known system, a backward acting control of the detection threshold is provided for each rectangular pulse which depends upon amplitude peak value, producing an equalization of the difference pulse widths of the rectangular pulses as detected.

In German patent DE-AS No. 28 29 175, patented July 3, 1980, a method of modifying binary digital data signals is described that tackles the task of holding the average amplitude of the modulated data signal within a prescribed time span fully or approximately equal to a reference value. In that system correction pulses are generated having amplitude and polarity dependent upon the width of individual pulses and their polarity, determined in such a way that after addition of the correction pulses to the original pulses, the requirement of a constant overall average amplitude is fulfilled as fully as possible. The circuit for carrying out that known modification method is extraordinarily expensive.

SUMMARY OF THE INVENTION

It is an object of the present invention to modify a serial binary digital signal before its transmission through a distorting channel or before its recording, so that the above-mentioned amplitude variations in the reproduction of the pulses of the signal are to a great extent compensated.

Briefly, the data stream is compared with bit sequence patterns typical of those which give rise to amplitude deficiencies, and the comparison result identifies the critical bits and provides a correction signal which is then combined with the data stream in a processing arrangement that broadens the critical bit pulse. This has the advantage that the amplitude variations in reception or reproduction are essentially compensated and the difficulties of demodulation resulting from fluctuation of peak amplitudes are reduced or eliminated.

In accordance with the invention, the broadening of the critical pulses can be done by providing a correction pulse that enhances the amplitude of the critical bit, followed by a Nyquist filter for limiting the bandwidth of the signal to the transmission or recording channel bandwidth, after which the filtered signal is limited to the normal binary digital signal pulse amplitude, at which point the critical pulse is desirably broadened. Alternatively, a correction pulse can be produced as the result of comparing the data stream with stored bit patterns which serve to identify the critical pulses, which correction pulse is provided with a phase shift so that it can then be combined with the critical pulse in such a way as to broaden it at the expense of either the immediately preceding bit pulse or the next following bit pulse.

The detection can be readily done by multi-bit comparators, preferably a pair of comparators in which there are respectively stored mutually complementary bit patterns.

Further details of the invention are best understood on the basis of the detailed description that follows.

BRIEF DESCRIPTION OF THE DRAWINGS

The invention is further described by way of illustrative examples with reference to the annexed drawings, in which:

FIGS. 1a, 1b, 1c and 1d are representations on a common time scale, respectively, of the timing intervals, the logic content, and the signal voltage profile before and after transmission or storage of a binary digital signal;

FIG. 2 is a circuit block diagram of a system for pre-distorting the signal so as to compensate for the effect shown in FIG. 1;

FIGS. 3a ... 3g are graphs on a common time scale relating to a signal processed by the circuit of FIG. 2;

DESCRIPTION OF THE ILLUSTRATED EMBODIMENTS

Figure 4:
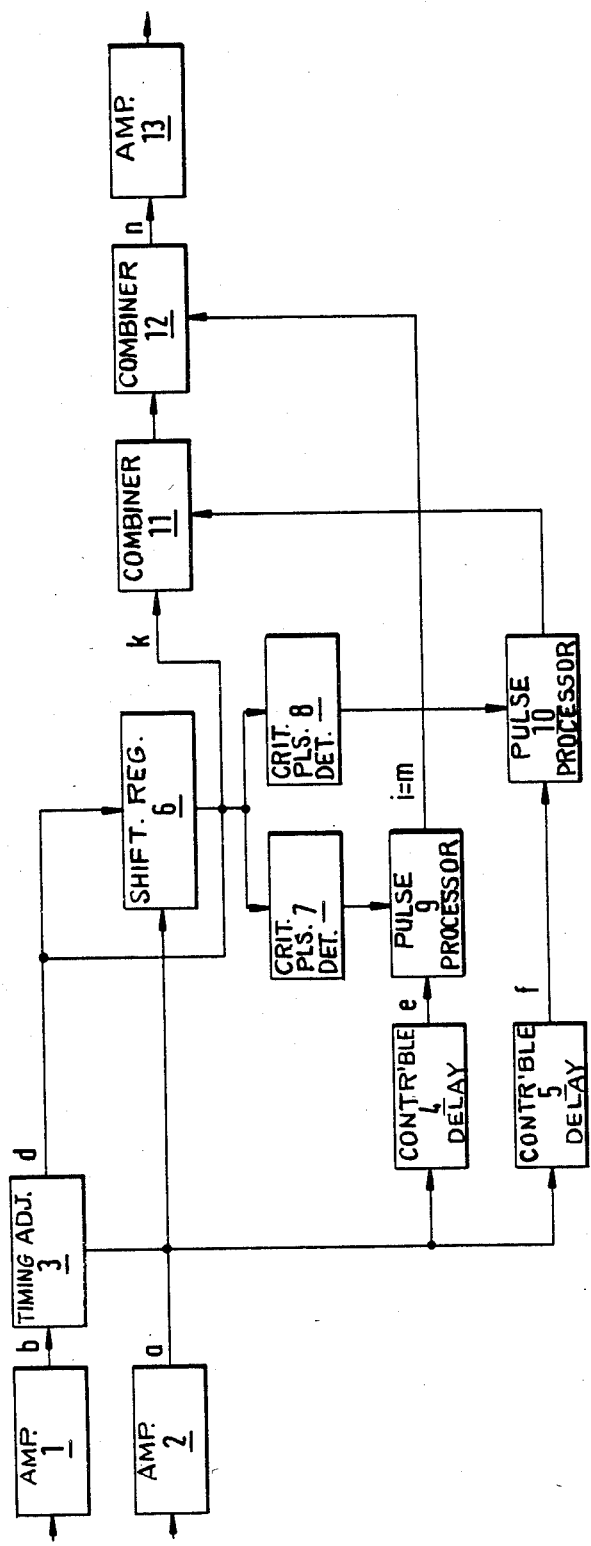
FIG. 4 is a block circuit diagram for providing an operation on a digital basis comparable to that of FIG. 2.

FIG. 1a shows the clock- or bit-rate frequency of a digital signal serving as the time scale for the diagram below it. FIG. 1b shows the critical pulse sequences . . . LLHLH . . . and . . . HHLHL . . . forming part of a continuous signal that is regarded as a train of pulses even though there is no change in signal between successive pulses of the same polarity. FIG. 1c shows the two pulse sequences just mentioned as voltage signals of the binary type. FIG. 1d shows the amplitude values of the output signal retrieved in the reproduction of the signal of FIG. 1c after storage or transmission over a considerable transmission path. The critical sequences are mutually complementary.

As shown in FIG. 1d, there is a difference between an individual pulse of a certain polarity according to whether it follows two successive pulses of the opposite polarity or only one pulse of the opposite polarity when the signal pulse sequence is reproduced, the difference being a noticeable deviation in the pulse amplitude, resulting in substantial difficulties in demodulation.

The circuit shown in FIG. 2 is composed of one circuit portion for recognizing the critical pulse sequence and another for correcting this pulse sequence before recording or comparable transmission.

The pulse sequence entering the circuit at 521 is first delayed by one clock period in each of the delay units 522, 523, 524 and 525 and then supplied to two comparators 526 and 527. These comparators each are constituted so as to provide an output signal upon the occurrence of a pulse sequence recognized as critical on the basis of theoretical considerations, for example the complementary pulse sequences just mentioned. For this purpose there may, for example, be used comparators of ECL type F 10016 or Fairchild type F 100166. Each comparator makes comparison with one of the complementary sequences.

The outputs of the two comparators are put together in the addition circuit 528, which does not need a carry output. Its output signals are added in turn in signal level to the signals on the line 529 by means of a further addition circuit 530. When a critical pulse appears on the line 529, a level rise is produced for the signals at the output of the addition circuit 528. A Nyquist filter 531 imposes an upper frequency limit to the output of the addition circuit 530, cutting off all higher frequencies and amplitude limiting of the filtered output is provided by the limiter 532, so that signals corresponding to the amplitude/time profile of FIG. 3g are produced at the output of the circuit of FIG. 2. This means that the critical pulses 534 and 535 of the continuing row of pulses shown in FIG. 3b are widened. In the transmission of pulses pre-corrected in that fashion, the amplitude fluctuations shown in FIG. 1d still take place, but these fluctuations only eliminate the pre-distortion, so that trouble-free demodulation is possible after transmission (or recording). The connection of line 521 to the output of delay cell 523 selects the correct bit of the data for modification by adding the output of the adder 528.

FIG. 4 shows an overall block diagram for accomplishing a similar corrective pre-emphasis on a digital basis. In that circuit binary data signals are amplified in an input amplifier 1 and the corresponding clock signals are amplified in an input amplifier 1 and the entering clock signals are amplified in an input amplifier 2. Phase synchronization between data and clock signals is provided by the timing adjustment stage 3. Two digitally controllable delay units 4 and 5 are connected to the output of the input amplifier 2 for processing the clock signals so that clock signals when subjected to various delays, can be provided. Clock signals from the input amplifier 2 and time-adjusted data signals from the output of the stage 3 are both supplied to a shift register 6, from the outputs of which the data signals proceed with different delay times to two comparators 7 and 8 in which particular pulse sequences of a kind that can be defined by a predetermined setting of the comparators can be selected from the continuously running data stream.

The pulse preparation stages 9 and 10 generate correction pulses corresponding to the pulses recognized as critical individual pulses by the detectors 7 and 8. Correlation circuits 11 and 12 successively process the output of the shift register 6 with reference to control signals obtained respectively from the circuits 10 and 9. The data stream with the thus processed (broadened) critical individual pulses is then supplied to an output amplifier 13 which provides an output for the circuit as a whole.

Figure 5A:
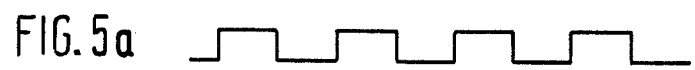
FIGS. 5a ... 5n are graphs on a common time scale relating to a signal processed by the circuit of FIG. 4.

FIGS. 5a ... 5n represent the steps of processing by reference to pulse diagrams for a pulse sequence HHLHL, the letters a ... n showing the corresponding places in FIG. 4 where the outputs of the processing stages are to be found.

Figure 5B:
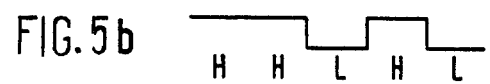
Figure 5C:
Figure 5D:
Figure 5E:
Figure 5F:
Figure 5G:
Figure 5H:
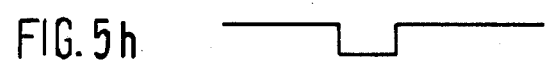
Figure 5I:
Figure 5K:
Figure 5L:
Figure 5M:
Figure 5N:
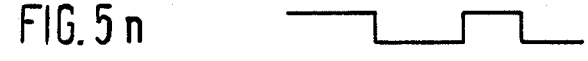

FIG. 5a shows the clock signals in the input amplifier 2 and FIG. 5b the data signal in the input amplifier 1. After timing adjustment in the synchronizing stage 3, the time relations illustrated in FIGS. 5c and 5d are established. The two clock signals are finally delayed differently by means of the digitally controllable clock pulse delay stages 4 and 5, as shown in FIGS. 5e and 5f. With the assistance of the pulse preparation stages, a recognition signal coming out of the comparator indicating the occurrence of a critical pulse, as shown in FIG. 5h, is synchronized with the clock pulses corresponding to FIG. 5i. The pulse sequence to be corrected, illustrated in FIG. 5d, after corresponding running time processing in stage 9, and also in stage 12 by combining the data pulse sequence with the correction pulse m, (corresponding to FIG. 5i) is combined to provide the corrected pulse sequence shown in FIG. 5n.

The preparation of a H-pulse takes place in a corresponding way with the assistance of the pulse sequence detector stage 8, the pulse preparation stage 10 and the combining stage 11. This occurs in processing an LLHL sequence.

Figure 6A:
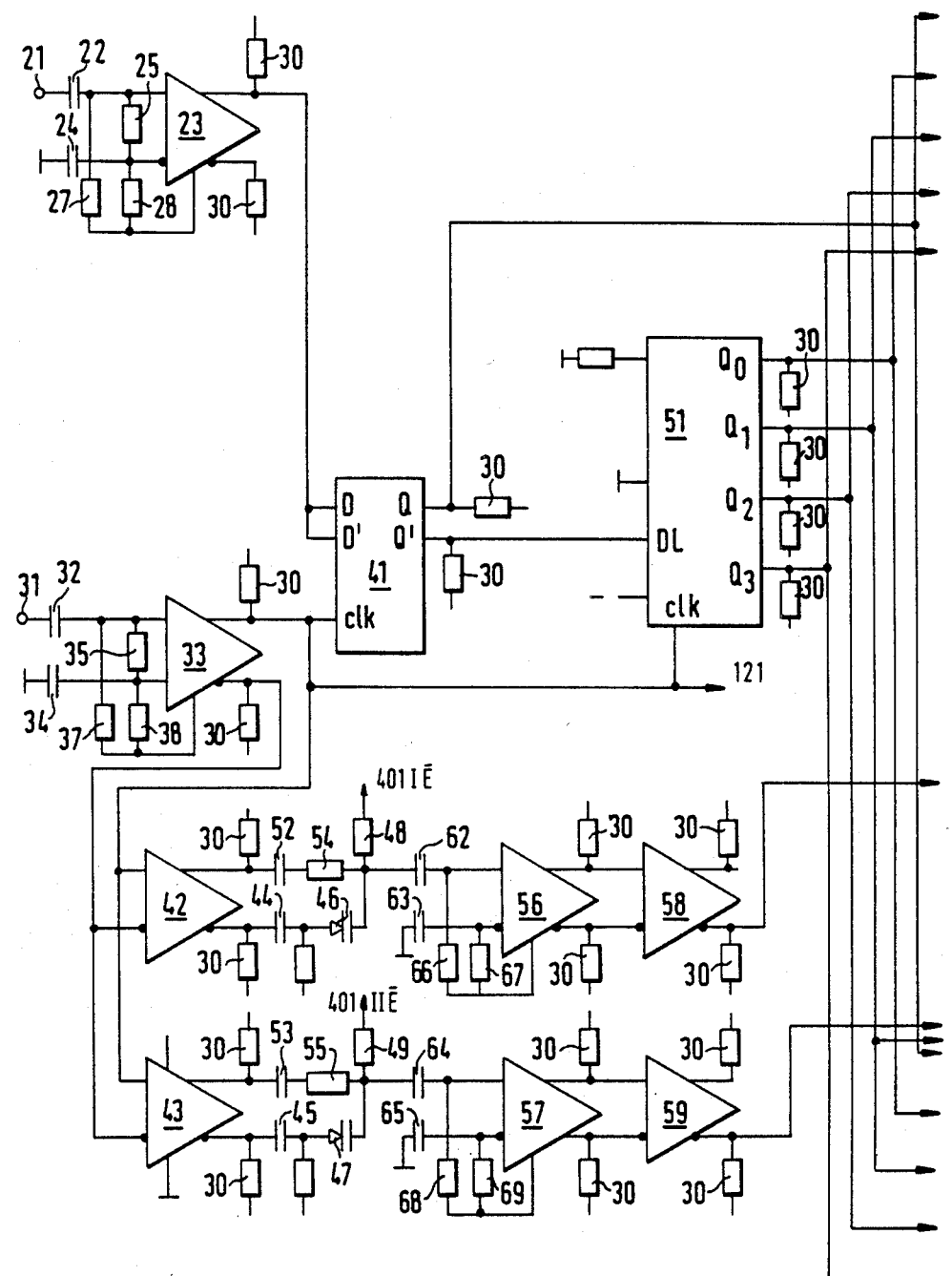
FIG. 6A is a more detailed circuit diagram of a first half of a circuit according to FIG. 4.
Figure 6B:
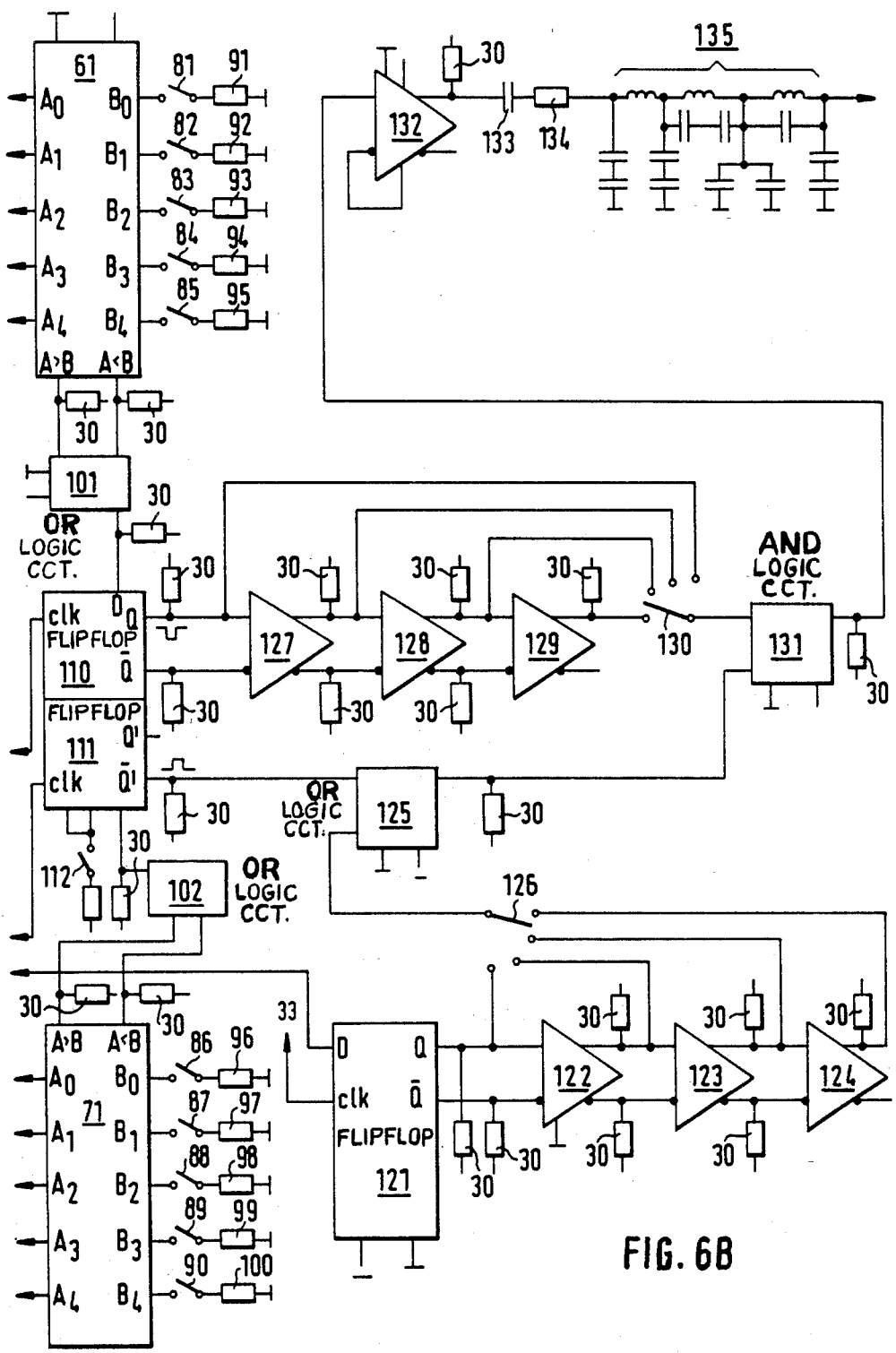
FIG. 6B is a second half of a more detailed circuit diagram of the same circuit according to FIG. 4.
Figure 6C:
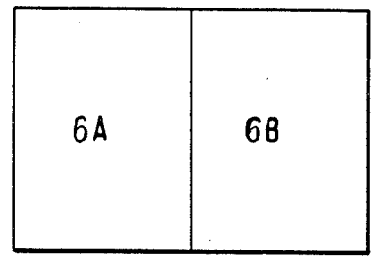
FIG. 6C is a diagram showing how the circuits of FIGS. 6A and 6B fit together.

The circuit portions shown in FIGS. 6A and 6B go together as shown in FIG. 6C. These figures together show a more detailed circuit diagram of the apparatus more simply shown in FIG. 4.

In FIG. 6A the data entering at 21 are applied through a coupling capacitor 22 to the non-inverting input of a differential amplifier 23. The inverting input of the differential amplifier 23 is connected through a coupling capacitor 24 to ground. The input line 21 is provided with a suitable termination by the resistance 25.

The reference voltage output of the differential amplifier 23 is applied to the respective inputs thereof through the respective resistances 27 and 28. The non-inverting and inverting outputs are each provided with a connection through a resistance 30 to the negative supply voltage terminal.

All the resistances designated by the reference numeral 30 in FIGS. 6A and 6B serve to provide resistive terminations with respect to the negative voltage supply terminals for the outputs of the various components. In the same way, the input stage 33 is constituted by a differential amplifier of which the non-inverting input is connected through a coupling capacitor 32 with the input line 1 that provides the clock signals. The inverting input of the differential amplifier 33 is connected to ground through another coupling capacitor 34. The reference voltage output of the differential amplifier 33 is connected through resistances 37 and 38 respectively to the inputs of the differential amplifier, which has a line terminating resistor 35 between those inputs for the clock pulse line connected to the terminal 31.

Figure 7:
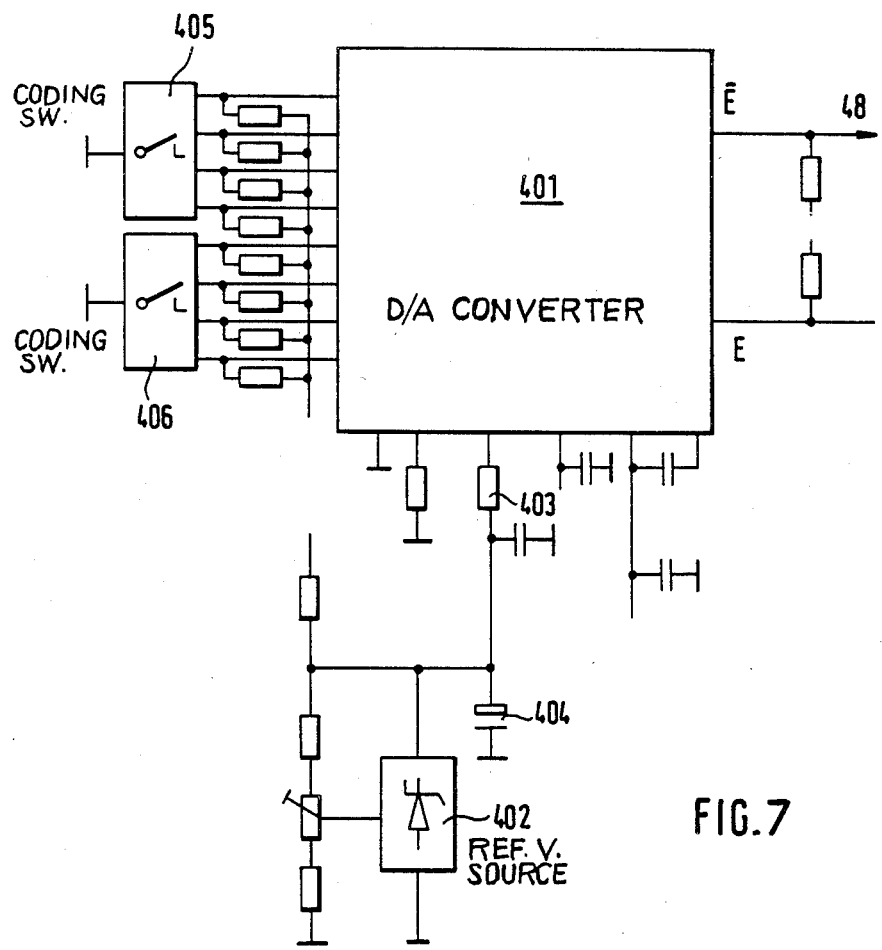
FIG. 7 is a diagram of the external circuitry connecting to the digital-to-analog converter stages of FIG. 6A.

The clock signals proceed from the non-inverting output of the differential amplifier 33 to the CLK input of the component 41 that contains two D-flipflops. The prepared data signals produced at the non-inverting input of the differential amplifier 23 are at the same time supplied to the D and D' inputs of the component 41 and synchronized there with the clock pulses at the CLK input. The now synchronized data signals then proceed from the Q' output of the component 41 to the DL input of a four-stage shift register 51, while the clock signal is similarly supplied to the CLK input of the shift register 51 in the same way as in the case of the component 41. The data signals proceed undelayed from the Q output of the component 41 to the $A_0$ of the two 5-bit comparators 61 and 71, whereas from the outputs $Q_0$ to $Q_3$ of the shift register 51, the data signals proceed with successive delays of one clock period respectively to the inputs $A_1$ to $A_4$ of the comparators 61 and 71 (FIG. 6b). Two further differential amplifiers 42 and 43 are connected to follow the outputs of the differential amplifier 33 in order to provide approximately stepless delay of the clock signal. The differential amplifiers 42 and 43 have their inverting outputs connected for transmission of alternating voltage through coupling capacitors 44 and 45 to the respective cathode terminals of the capacitance diodes 46 and 47. The anode connections of the respective capacitance diodes 46 ad 47 are respectively connected through resistors 48 and 49 with the $\overline{E}$ outputs of a digital-to-analog converter stage 401. The circuit connections of the digital-to-analog converter stage 401 is described near the end of this description with reference to FIG. 7.

The a.c. voltage components of the clock signals are coupled out of the differential amplifiers 42 and 43 by means of the coupling capacitors 52 and 53 to series resistors 54 and 55 leading to the resistors 48 and 49 respectively. This portion of the circuit serves to obtain from the clock signal proper two differently delayable clock signals which can be used in the further course of the circuit to convert a recognition signal coming from the comparators 61 and 71 into correction pulses by means of the D-flipflops 110 and 111. The differential amplifiers 56 and 57 are respectively connected to follow the differential amplifiers 42 and 43 in circuit in such a way that, for the purpose of obtaining normalized d.c. voltage conditions but, only the d.c. voltage components of the phase shifted clock signals reach, by virtue of the coupling capacitor 62,63,64, and 65, the inputs of the differential amplifiers 56 and 57. The reference voltage outputs of the differential amplifiers 56 and 57 are in turn connected through resistors 66,67 and 68,69 to the two inputs of the corresponding amplifier.

In order to obtain timed relations between data and clock signals, two more differential amplifiers 58 and 59 are connected to follow respectively the differential amplifiers 56 and 57, the internal propagation time of these amplifier stages being utilized for the desired delay.

By means of the selector switches 81 to 85 and 86 to 90, a second row of inputs $B_0$ to $B_4$ of each of the comparators 61 and 71 can be connected to a reference voltage respectively through the resistances 91 to 95 and 96 to 100. In this manner, the voltage levels H or L can be selectively called up. In the illustrated example, for example, the voltage state sequence HHLHL can be applied to the inputs $B_4$ to $B_0$ of the comparator 61 by means of a selector switch, and at the same time, the sequence LLHLH to the inputs $B_4$ to $B_0$ of the comparator 71. In this case, a closed switch 81 to 85 or 86 to 90 always corresponds to a H state, while an open switch corresponds to a L circuit. When a data sequence corresponding to this sequence of signal states appears at the inputs $A_4$ to $A_0$ of the comparator 61 the two outputs $A>B$ and $A<B$ of this comparator are in the L state. With the assistance of the following OR logic element 101, a signal from that component is given to the D input of the D flipflop 110 when these two L states appear at the respective outputs of the comparator. In the same way when a data sequence at the inputs $A_4$ to $A_0$ of the comparator 71 matches the prescribed level states at the inputs $B_4$ to $B_0$ of this comparator, an L signal will be provided at both the $A>B$ and $A<B$ outputs and, by means of the OR logic element 102, an output signal will be provided to the B' input of the flipflop 111. The clock input CLK of the flipflops 110 and 111 are connected with the inverting outputs of the differential amplifiers 58 and 59 respectively (FIG. 6A), so that different phase relations are provided for the clock pulse sequences applied to the respective CLK inputs of the flipflops 110 and 111. By means of the switch 112, both flipflops 110 and 111 can be set, so that an H signal continuously appears at the Q outputs, while at the $\overline{Q}$ outputs, an L signal correspondingly appears, as the result of which the correction system is disabled.

Another D flipflop 121 has its D input connected with the inputs $A_2$ of the two comparators 61 and 71 in common. The clock inputs CLK of the components 41 and 51 are likewise connected with the clock input of the D flipflop 121. When a pulse regarded as critical at one of the inputs $A_2$ of the comparators 61 and 71, respectively, therefore, a correction pulse is produced from the Q output of the D flipflop 110 or at the $\overline{Q}'$ input of a flipflop 111. At the same time, the data sequence also runs through the D flipflop 111, the Q and $\overline{Q}$ outputs of which are connected to further differential amplifiers 112, 123, 124 in series for obtaining defined time delays. The Q output of the flipflop 121 and likewise the non-inverting outputs of the differential amplifiers 112, 123 and 124 are supplied to respective poles of a multiple position switch to the common pole (arm) of which one input of an OR stage 125 is connected. The second input of the OR stage 125 is connected to the $\overline{Q}'$ output of the D flipflop 111, so that when a critical pulse appears at the input $A_2$ of the comparator 71 a defined broadening of the pulse in question is produced by the correction pulse from the $\overline{Q}'$ output with the time period defined by the position of the switch 126, the broadening being at the preceding or following pulse. In a similar way, the differential amplifiers 127,128 and 129 are connected in series to follow the Q and $\overline{Q}$ outputs of the flipflop 110, while in each case the undelayed Q output and the non-inverting outputs of the differential amplifiers 127,128 and 129 are provided to a four-pole switch 130. The common pole of the four-position switch 131 leads to one input of an AND circuit 131 which has its second input connected to the output of the OR stage 125.

The data sequence with its critical pulses corrected in width proceeds from the output of the AND circuit 131 to the input of an output amplifier 132. The output of the amplifier 132 then goes through a coupling capacitor 133, a series resistor 134 and a filter 135 to the output of the overall circuit.

In order to obtain constant operating conditions for the digital-to-analog converter 401 (FIG. 7), a reference voltage source 402 is connected through a resistor 403 to the reference voltage input for the positive reference voltage. For supplementary stabilization, this positive reference voltage is capacitively bypassed to ground by the electrolytic capacitor 404. A digital number in 8-bit parallel form is set in by means of the coding switches 405 and 406. In accordance with the digital number thus set in, there appears at the output $\overline{E}$ of the digital-toanalog converter 401 an analog voltage that is applied to the anode of the capacitance diode 46 in accordance with FIG. 6A. In consequence, there occurs, with cooperation of the series resistor 54, a phase shift of the clock signal running through this portion of the circuit which corresponds to the digital number that has been set. In the same way, the clock signals running through the differential amplifier 43 are shifted in phase by means of an identical second circuit according to FIG. 7 and the series resistance 55, so that the two amounts of delay can be set differently. In this manner the correction signals from the outputs Q and $\overline{Q}'$ of the D flipflops 110 and 111 can be adjusted in very fine steps for timing insertion into the data stream, and hence the desired broadening of critically located narrow pulses, all during the running of a data stream.

The circuit components containing integrated circuits appearing in FIGS. 6A and 6B can be provided in practice by the provision of commercially available units obtainable from the Motorola company according to the following table:

| REFERENCE NUMERALS IN THE ANNEXED DRAWINGS | COMPONENT TYPE DESIGNATION |
|---|---|
| 23 | ¼ MC 10 116 |
| 33,42,43 | MC 10 116 |
| 41 | MC 10 131 |
| 51 | MC 10 141 |
| 46,57 | ⅜ MC 10 116 |
| 58,59 | ⅜ MC 10 116 |
| 61,71 | 2 × MC 10 166 |
| 110,111 | MC 10 231 |
| 101,102 | 2 × MC 10 105 |
| 132 | ¼ MC 10 116 |
| 127,128,129 | MC 10 116 |
| 122,123,124 | MC 10 116 |
| 125 | MC 10 105 |
| 121 | MC 10 131 |
| 131 | MC 10 104 |

Although the invention has been described with reference to particular illustrative examples, it will be understood that variations and modifications are possible within the inventive concept.

We claim:

1. Method of correcting amplitude variations in the reception or reproduction of digital electric signals comprising the steps of:
   storing digital signal sequences of signal patterns known to be subject to variation in amplitude of pulses received or reproduced by reason of peak amplitude shift occurring in signal sequences having great differences in the length of intervals between transitions from one binary signal level to the other and storing also identification of pulses of said stored signal sequences which unless broadened are likely if transmitted to be received or reproduced with deficient signal amplitude;
   detecting said patterns in a stream of binary digital signals to be transmitted or recorded, by the comparison of said stored digital signal sequences with said data stream;
   selecting pulses of detected signal sequences of said patterns in said data stream which unless broadened are likely to received or reproduced with deficient signal amplitude, and
   broadening only said selected pulses of said data stream.

2. Method according to claim 1 in which said data stream is supplied to at least one pair of multibit comparators, each comparator of said pair having one said signal pattern digital signal sequence stored therein, the two signal patterns respectively stored in the comparators of each pair having a complementary relation to each other, the said comparators of each pair being constituted to respond in a manner designating a critical pulse of said data stream as a said selected pulse.

3. Method according to claim 2 in which the output signals of said comparators coinciding with said selected pulses are added to said data stream in a sense enhancing the amplitudes of said selected pulses, after which the data stream thus modified is filtered to fit the upper limit of a transmission or recording channel and then amplitude-limited to the normal binary signal amplitude limits.

4. Method according to claim 3 in which said data stream is presented to said comparators by a shift register (22-25) one output of which is used in the addition step for addition to the sum of the outputs of said comparators.

5. Method according to claim 1, in which the step of signal pattern detection is performed by the steps of:
   stepwise delay of said stream of digital signals for successive bit periods for at least four steps, and
   controllably delaying clock signals related to said stream of digital signals
and in which the signal pattern detecting step includes the generation of a comparison result pulse of predetermined length when a said pattern is detected, and the step of broadening pulses of said data stream includes the steps of:
   shifting the phase of said comparison result pulse by means of controllably delayed clock signals, and
   combining the phase shifted comparison result pulse with said data stream pulses in such a way as to broaden a pulse selected as a critical pulse in the signal detecting step.

6. Method according to claim 5 in which the step of combining a phase shifted comparison result pulse with said data stream pulses is done in such a way as to broaden said selected pulse by advancing its leading flank relative to the preceding pulse.

7. Method according to claim 5 in which the step of combining a phase shifted comparison result pulse with said data stream pulses is done in such a way as to broaden said selected pulse by retarding its trailing flank relative to the next following pulse.

8. Apparatus for preprocessing binary digital signals of a data stream before transmission or recording for correction of amplitude variation when received and reproduced, comprising:
   means for comparing signals of said data stream separately with at least one pair of complementary signal sequence patterns and thereby designating pulses of said data stream subject to amplitude deficiency when received or reproduced and providing an output from which a correction generating pulse is obtainable;
   delay circuit means for separately adjusting the timing phase of said data stream signals supplied to the respective comparing means for comparison with the respective signal sequences of a complementary pair;
   means for adding pulses derived from the respective outputs of said comparators to said designated pulses in a sense enhancing the amplitude of pulses of respectively opposite polarity according to which comparator output is used, and thereby providing as an output, a modified digital signal data stream;

a Nyquist filter connected for filtering said output of said adding means and thereby providing a filtered output, and amplitude limiting means connected to the output of said Nyquist filter for limiting amplitude of said filter output to a normal binary digit amplitude.

9. Apparatus according to claim 8, in which a shift register is used for presenting said data stream to a pair of comparing means for comparison with complementary signal patterns, and said adding means includes a first adder for adding the outputs of said comparators to produce correction pulses and also a second adder for adding the output of said first adder to one output of said shift register representing said data stream.

10. Apparatus for correcting amplitude variations in a received or reproduced serial binary digital signal stream by broadening before transmission or recording those pulses likely to be received or reproduced with deficient amplitude by reason of peak amplitude shift occurring in signal sequences having great differences in the length of intervals between transitions from one binary signal level to the other comprising:

means for synchronizing said signal stream with clock pulses related thereto;

multistage means for delaying said signal stream by integral bit interval steps;

at least one multibit comparison means (7) for detecting a predetermined bit sequence pattern in said data stream known to be subject to variation in amplitude of received or reproduced pulses by reason of peak amplitude shift occurring in signal sequences having great differences in the length of intervals between transitions from one binary signal level to the other including means (46, 57, 56, 40) for controllably delaying said clock pulses, said comparison means being equipped for identifying at least one pulse of said bit sequence pattern as likely to be received or reproduced with deficient amplitude;

at least one pulse modification means (9) connected to said at least one comparison means (7) for producing a correction pulse for broadening a partially contemporary pulse of said data stream identified by said comparison means, and means for combining said correction pulse and said partially contemporary pulse of said data stream in a manner broadening said partially contemporary pulse.

11. Apparatus according to claim 10 in which there are comprised two said multibit comparison means (7,8) and two said pulse modification means (9,10) respectively responsive to said two multibit comparison means for respectively detecting and responding to detection of two mutually inverse predetermined bit sequence patterns.

* * * * *